(12) United States Patent
Iida

(10) Patent No.: US 9,723,168 B2
(45) Date of Patent: Aug. 1, 2017

(54) INFORMATION PROCESSING APPARATUS, INFORMATION PROCESSING SYSTEM, AND COMPUTER PROGRAM PRODUCT

(71) Applicant: Hirokazu Iida, Kanagawa (JP)

(72) Inventor: Hirokazu Iida, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/058,378

(22) Filed: Mar. 2, 2016

(65) Prior Publication Data

US 2016/0277621 A1 Sep. 22, 2016

(30) Foreign Application Priority Data

Mar. 19, 2015 (JP) .................................. 2015-056321
Jan. 15, 2016 (JP) .................................. 2016-006605

(51) Int. Cl.
*H04N 1/00* (2006.01)
*H04L 29/08* (2006.01)
(Continued)

(52) U.S. Cl.
CPC ......... *H04N 1/00973* (2013.01); *H04L 67/10* (2013.01); *H04L 67/34* (2013.01);
(Continued)

(58) Field of Classification Search
CPC .... G06F 3/1238; G06F 3/1285; G06F 3/1288; G06F 3/1287; G06F 21/608; G06F 3/1286; G06F 3/1292; G06F 21/31; G06F 3/1243
(Continued)

(56) References Cited

U.S. PATENT DOCUMENTS 8,520,850 B2 * 8/2013 Helms ................. H04L 63/0428
380/201
8,621,540 B2 * 12/2013 Apsangi .............. H04L 63/0428
380/239

(Continued)

FOREIGN PATENT DOCUMENTS

| JP | 2007-219576 | 8/2007 |
| JP | 2008-059239 | 3/2008 |
| JP | 2008-129653 | 6/2008 |

*Primary Examiner* — Negussie Worku
(74) *Attorney, Agent, or Firm* — Oblon, McClelland, Maier & Neustadt, L.L.P.

(57) ABSTRACT

An information processing apparatus, which connects to at least one client apparatus via a first network and is connectable to an external apparatus via a second network, includes first and second receiving units, a specifying unit, first and second switching units, and a transmitting unit. The first receiving unit receives client information from the client apparatus via the first network. The specifying unit specifies a device connected to the first network and controllable by the client apparatus. The first switching unit switches connection from the first network to the second network. The second receiving unit receives, based on the client information and the specified device, a control program for controlling the device from the external apparatus via the second network. The second switching unit switches connection from the second network to the first network. The transmitting unit transmits the received control program to the client apparatus via the first network.

9 Claims, 10 Drawing Sheets

(51) Int. Cl.
*H04N 1/327* (2006.01)
*H04N 1/44* (2006.01)
*H04L 29/06* (2006.01)

(52) U.S. Cl.
CPC ......... *H04L 69/18* (2013.01); *H04N 1/00244* (2013.01); *H04N 1/00307* (2013.01); *H04N 1/00411* (2013.01); *H04N 1/00938* (2013.01); *H04N 1/32765* (2013.01); *H04N 1/32786* (2013.01); *H04N 1/4413* (2013.01); *H04N 2201/0094* (2013.01)

(58) Field of Classification Search
USPC ..................... 358/1.15, 1.13, 1.9; 709/223
See application file for complete search history.

(56) References Cited

U.S. PATENT DOCUMENTS

| | | | |
|---|---|---|---|
| 8,881,282 B1* | 11/2014 | Aziz | G06F 21/554 726/23 |
| 9,355,228 B2* | 5/2016 | Smith, III | G06F 21/121 |
| 2004/0111418 A1* | 6/2004 | Nguyen | G06F 3/1205 |
| 2005/0210227 A1* | 9/2005 | Emerson | G06F 3/1205 713/1 |
| 2008/0055640 A1* | 3/2008 | Takahashi | G06F 9/4411 358/1.15 |
| 2010/0332633 A1* | 12/2010 | Keys | G06F 8/68 709/223 |
| 2010/0333082 A1* | 12/2010 | Keys | G06F 8/68 717/173 |
| 2012/0167162 A1* | 6/2012 | Raleigh | G06F 21/57 726/1 |
| 2012/0218576 A1* | 8/2012 | Sekine | G06F 3/1247 358/1.13 |
| 2013/0016627 A1* | 1/2013 | Higashihara | H04L 43/10 370/254 |
| 2014/0233057 A1 | 8/2014 | Iida | |
| 2014/0347692 A1 | 11/2014 | Iida | |
| 2015/0324667 A1* | 11/2015 | Harada | G06F 3/1205 358/1.15 |

* cited by examiner

| IP ADDRESS OF CLIENT APPARATUS | DEVICE NAME | PDL |
|---|---|---|
| 10.20.30.40 | RICOH MP 1234 | RPCS |
| | Afficio MP 9999 | PS |
| ⋮ | ⋮ | ⋮ |

INFORMATION PROCESSING APPARATUS, INFORMATION PROCESSING SYSTEM, AND COMPUTER PROGRAM PRODUCT

CROSS-REFERENCE TO RELATED APPLICATIONS

The present application claims priority to and incorporates by reference the entire contents of Japanese Patent Application No. 2015-056321 filed in Japan on Mar. 19, 2015 and Japanese Patent Application No. 2016-006605 filed in Japan on Jan. 15, 2016.

BACKGROUND OF THE INVENTION

1. Field of the Invention

The present invention relates to an information processing apparatus, an information processing system, and a computer program product.

2. Description of the Related Art

In view of security and the like, environments are constructed in which client apparatuses connected to a local network such as an in-house network are limited in terms of connection to external networks. However, in an environment in which a plurality of client apparatuses and printers are connected via a network, a manager who manages device drivers to be installed on the client apparatuses is required to perform processing for installation and an update every time when an update of a device driver or installation of a new client apparatus is taken place, which takes time and trouble.

In view of such circumstances, a technique is disclosed in which a printer connected to a local network acquires a driver from an external apparatus via a router and an external network, and the printer distributes the driver to client apparatuses connected to the local network, for example (Japanese Laid-open Patent Publication No. 2008-059239). In view of security and the like, environments are constructed in which client apparatuses connected to a local network such as an in-house network are limited in terms of connection to external networks.

However, the apparatuses connected to the local network in such an environment cannot download a control program for controlling a device from the external apparatus via the external network. For this reason, it has conventionally been difficult to maintain an environment in which connection from client apparatuses to external networks is controlled and to reduce loads on the manager side when the control program is installed on the client apparatuses.

SUMMARY OF THE INVENTION

It is an object of the present invention to at least partially solve the problems in the conventional technology.

According to an embodiment, an information processing apparatus connects to at least one client apparatus via a first network and is capable of connecting to an external apparatus via a second network. The information processing apparatus includes a first receiving unit, a specifying unit, a first switching unit, a second receiving unit, a second switching unit, and a transmitting unit. The first receiving unit receives client information related to the client apparatus from the client apparatus via the first network. The specifying unit specifies a device that is connected to the first network and is capable of being controlled by the client apparatus. The first switching unit switches connection from the first network to the second network. The second receiving unit receives, based on the client information and the device specified by the specifying unit, a control program for controlling the device from the external apparatus via the second network. The second switching unit switches connection from the second network to the first network. The transmitting unit transmits the control program received by the second receiving unit to the client apparatus via the first network.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiments will be described in detail with reference to the attached drawings.

First Embodiment

Figure 1:
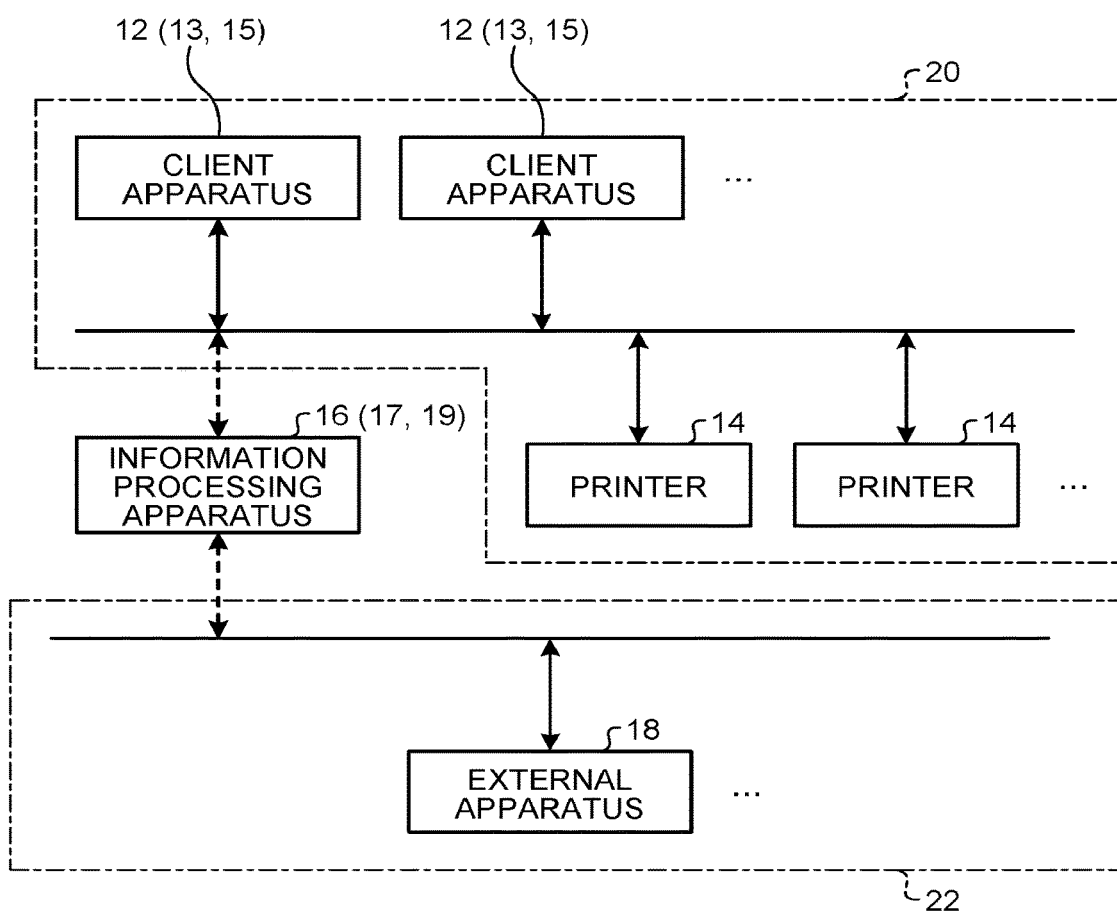
FIG. 1 is a diagram of an example of an information processing system.

FIG. 1 is a diagram of an example of an information processing system 10.

The information processing system 10 includes client apparatuses 12 and an information processing apparatus 16.

The client apparatuses 12 are connected to devices such as printers 14 via a first network 20. The client apparatuses 12 are not connected to a second network 22.

The first network 20 is a network connected to the client apparatuses 12 and the printers 14. The first network 20 is a network that requires authentication by a proxy server for Internet permission for connecting to the Internet via an intranet, for example. The first network 20 is specifically a local network such as an in-house local area network (LAN). The in-house LAN is a network constructed so as to enable only limited terminals to be connected thereto. The in-house LAN is a network constructed so as to enable only devices such as personal computers (PCs) and the printers 14 installed in a company to be connected thereto, for example.

The apparatuses (the client apparatuses 12 and the printers 14) connected to the first network 20 communicate in accordance with a known protocol such as TCP/IP, for example.

One or a plurality of client apparatuses 12 and one or a plurality of devices are connected to the first network 20. In other words, the client apparatuses 12 are connected to the devices via the first network 20.

The devices perform various kinds of processing responsive to instructions from the client apparatuses 12. The devices are known image forming apparatuses, scanner apparatuses, fax apparatuses, or multifunction peripherals having a plurality of functions, for example.

In the present embodiment, a description will be given for a case in which the type of the device connected to the first network 20 is the printer 14 as an example. The printer 14 is a known image forming apparatus.

The second network 22 is a network connected to an external apparatus 18 that stores therein a control program (details will be described below) to be installed on the client apparatuses 12. The second network 22 is a network that can connect to an external network such as the Internet, for example. In other words, the second network 22 is a network that can connect to the Internet beyond a proxy server of an in-house network such as the first network 20, for example. The apparatuses connected to the second network 22 communicate in accordance with a known communication protocol.

As described above, the client apparatuses 12 are not connected to the second network 22. In other words, the client apparatus 12 can connect to the devices and the other client apparatus 12 connected to the first network 20. However, the client apparatuses 12 are limited to access (be connected to) the external apparatus 18 connected to the second network 22. This is because the client apparatuses 12 are made not connectable to an external network (the second network 22) in view of security. The first network 20 and the second network 22 are not connected to each other.

The external apparatus 18 is a known computer that stores therein the control program for controlling the printer 14 (the device). The external apparatus 18 is a cloud server, for example. When the device is the printer 14, the control program for controlling the device is a printer driver, for example. When the device is a scanner, the control program for controlling the device is a scanner driver, for example. The control program stored in the external apparatus 18 is of the latest version.

The information processing apparatus 16 is connected to the client apparatuses 12 via the first network 20 and is connected to the external apparatus 18 via the second network 22. In other words, the information processing apparatus 16 can connect to both the client apparatuses 12 and the second network 22. However, the information processing apparatus 16 cannot connect to both the client apparatuses 12 and the second network 22 simultaneously (details will be described below).

The information processing apparatus 16 is preferably portable. Making the information processing apparatus 16 portable enables a manager to cause the information processing apparatus 16 to execute pieces of processing described below at any place. The information processing apparatus 16 is specifically a tablet terminal, a smart device, or the like.

A network configuration of the information processing system 10 is only necessary to be a state in which the second network 22 to which the external apparatus 18 that stores therein the control program connects and the first network 20 to which the client apparatuses 12 connect are separate networks and the client apparatuses 12 cannot connect to the first network 20 and is not limited to the configuration illustrated in FIG. 1.

Next, the following describes a hardware configuration of the client apparatus 12, the information processing apparatus 16, and the external apparatus 18 in the present embodiment.

Figure 2:
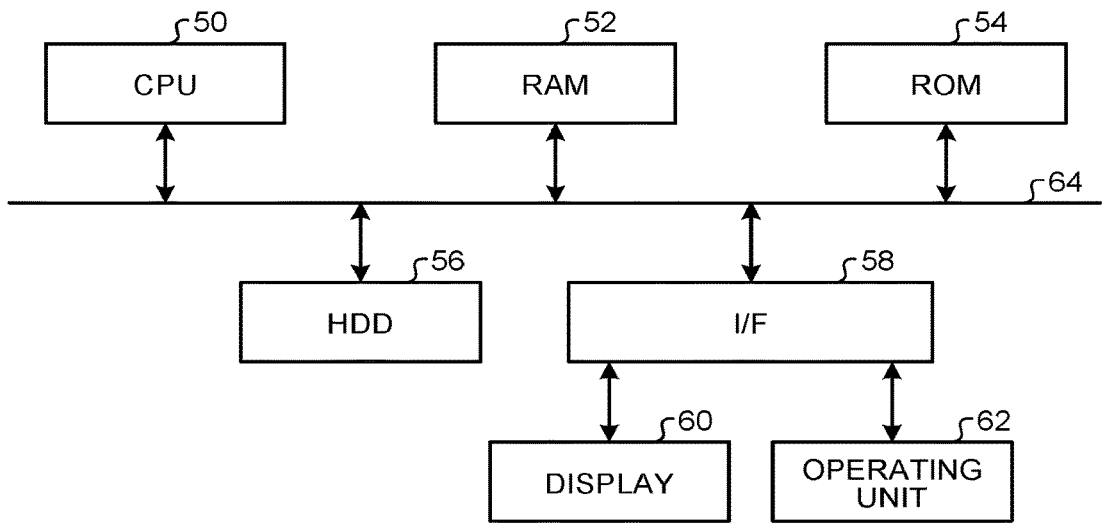
FIG. 2 is a diagram of an example of a hardware configuration.

FIG. 2 is a diagram of an example of the hardware configuration of the client apparatus 12, the information processing apparatus 16, and the external apparatus 18 in the present embodiment.

The client apparatus 12, the information processing apparatus 16, and the external apparatus 18 in the present embodiment each include a central processing unit (CPU) 50, a random access memory (RAM) 52, a read only memory (ROM) 54, a hard disk drive (HDD) 56, and an interface (I/F) 58. The CPU 50, the RAM 52, the ROM 54, the HDD 56, and the I/F 58 are connected to each other via a bus 64. A display 60 such as a known display apparatus and an operating unit 62 that receives various kinds of operations by a user are connected to the I/F 58.

The display 60 displays various kinds of images. The display 60 is a known display apparatus such as a liquid crystal display (LCD) or organic electro luminescence (EL), for example. The operating unit 62 is a member for allowing the user to perform various kinds of operation input. The operating unit 62 is a mouse, a button, a remote controller, a keyboard, or a voice recognition apparatus such as a microphone, for example.

The display 60 and the operating unit 62 may integrally be formed. Specifically, the display 60 and the operating unit 62 may be a touch panel including both an input function and a display function.

Figure 3:
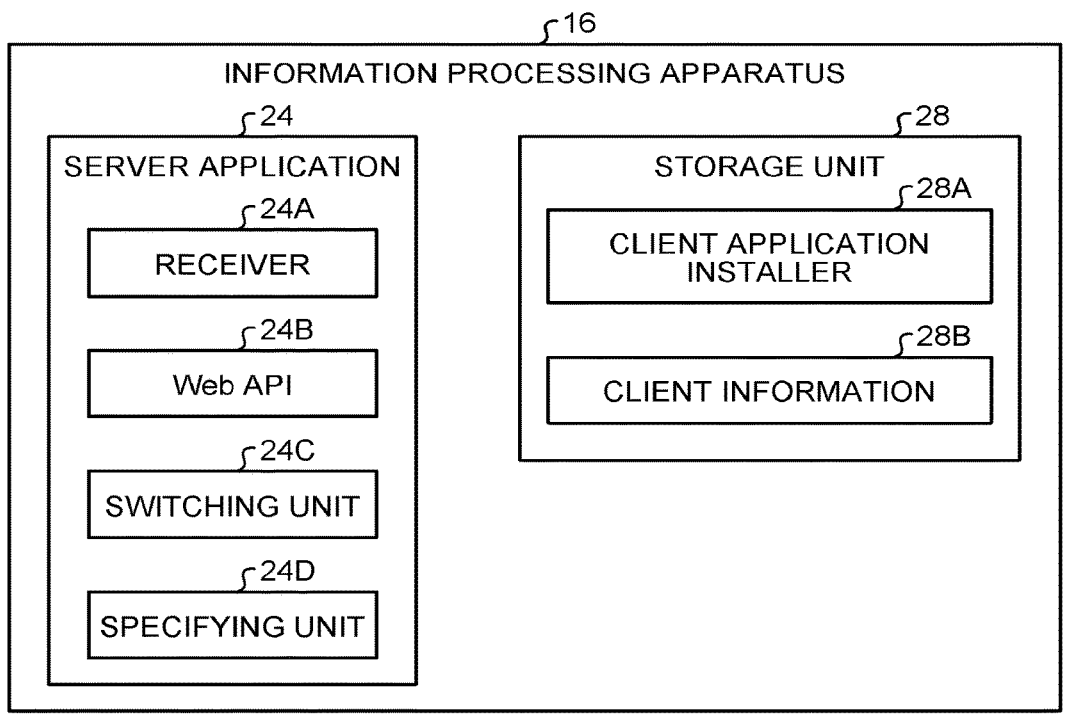
FIG. 3 is a functional block diagram of an information processing apparatus.

Next, the following describes the information processing apparatus 16. FIG. 3 is a functional block diagram of the information processing apparatus 16.

The information processing apparatus 16 includes a server application 24 and a storage unit 28. The storage unit 28 is a hard disk drive apparatus (the HDD 56) or a storage medium such as an internal memory. The storage unit 28 stores therein various kinds of data.

In the present embodiment, the storage unit 28 stores therein a client application installer 28A and client information 28B.

The client application installer 28A is an execution file (exe file) for installing a client application (a client application 30 described below) on the client apparatus 12. The client application is an application program for causing the client apparatus 12 to acquire the control program from the information processing apparatus 16.

In other words, the client application installer 28A includes the client application. When being executed, the client application installer 28A sets up the client application in the client apparatus 12.

The client information 28B is information related to the client apparatus 12. In the present embodiment, the client information 28B is identification information (an IP address, for example) of the client apparatus 12.

The server application 24 is an application program for acquiring the control program from the external apparatus 18 and transmitting the control program to the client apparatus 12. The server application 24 is installed on the information processing apparatus 16 in advance.

The server application 24 includes a receiver 24A (a second receiving unit), a web application programming interface (Web API) 24B (a first receiving unit or transmitting unit), a switching unit 24C (a first switching unit; a second switching unit), and a specifying unit 24D (a specifying unit).

In the present embodiment, the processor of the information processing apparatus 16 executes the server application 24, whereby the receiver 24A, the Web API 24B, the switching unit 24C, and the specifying unit 24D are loaded onto a main memory and are generated on the main memory, for example.

The switching unit 24C switches connection from the first network 20 to the second network 22. The switching unit 24C switches connection from the second network 22 to the first network 20. Specifically, when connection with the second network 22 becomes necessary, the switching unit 24C terminates the connection with the first network 20 and connects to the second network 22. When connection with the first network 20 becomes necessary, the switching unit 24C terminates the connection with the second network 22 and connects to the first network 20. In other words, the information processing apparatus 16 cannot connect to both the first network 20 and the second network 22 at the same timing.

The switching unit 24C connects to the second network 22 using a line for portable terminals such as the 4G line, for example. The switching unit 24C connects to the first network 20 using WiFi (registered trademark) connection, for example.

The Web API 24B is a system that uses functions of another program from an external computer program using HTTP. In the present embodiment, the client application 30 in the client apparatus 12 uses the Web API 24B in order to use functions of the server application 24.

The Web API 24B corresponds to the first receiving unit and transmitting unit. The Web API 24B receives the client information 28B related to the client apparatus 12 from the client apparatus 12 via the first network 20.

The specifying unit 24D specifies a device that is connected to the first network 20 and can be controlled by the client apparatus 12. In the present embodiment, a description will be given for a case in which the device is the printer 14 as an example.

In the present embodiment, the Web API 24B receives specifying information from the client apparatus 12 via the first network 20. The specifying information is information for specifying the device that is connected to the first network 20 and can be controlled by the client apparatus 12. The specifying information is information that can specify the printer 14 (the device). In the present embodiment, a description will be given for a case in which the specifying information is a device name of the printer 14. The specifying unit 24D specifies the printer (the device) specified by the device name (the specifying information) received by the Web API 24B as the device that is connected to the first network 20 and can be controlled by the client apparatus 12.

Based on the client information 28B received from the client apparatus 12 and the printer 14 specified by the specifying unit 24D, the receiver 24A downloads (receives) the control program for controlling the printer 14 from the external apparatus 18 via the second network 22.

The receiver 24A downloads the control program from the external apparatus 18 as the following procedure.

Specifically, when the switching unit 24C switches connection from the second network 22 to the first network 20, the Web API 24B receives download request information from the client apparatus 12.

The download request information is information that requests downloading of the control program for controlling at least part of the printers 14 connected to the first network 20.

The download request information contains the client information 28B (an IP address, for example) of the client apparatus 12 serving as a transmission source of the download request information, the device name (the specifying information) of the device (the printer 14 in the present embodiment) connected to the first network 20, and information on an operating system (OS) of the client apparatus 12. The information on the OS of the client apparatus 12 is information indicating the type and version of the OS installed on the client apparatus 12, for example.

The download request information may further contain the type of a language used in the device corresponding to the device name (a page description language (PDL) such as Refined Printing Command Stream (RPCS) and Post Script (PS), for example).

When a plurality of printers 14 are connected to the first network 20, the download request information contains the device names of the respective printers 14. In this case, the download request information contains, for each of the client apparatuses 12, the client information 28B (the IP address, for example), a plurality of device names (the specifying information), the types of the languages corresponding to the respective device names, and the information on the OS of the client apparatus 12, for example.

Figures 4, 5:
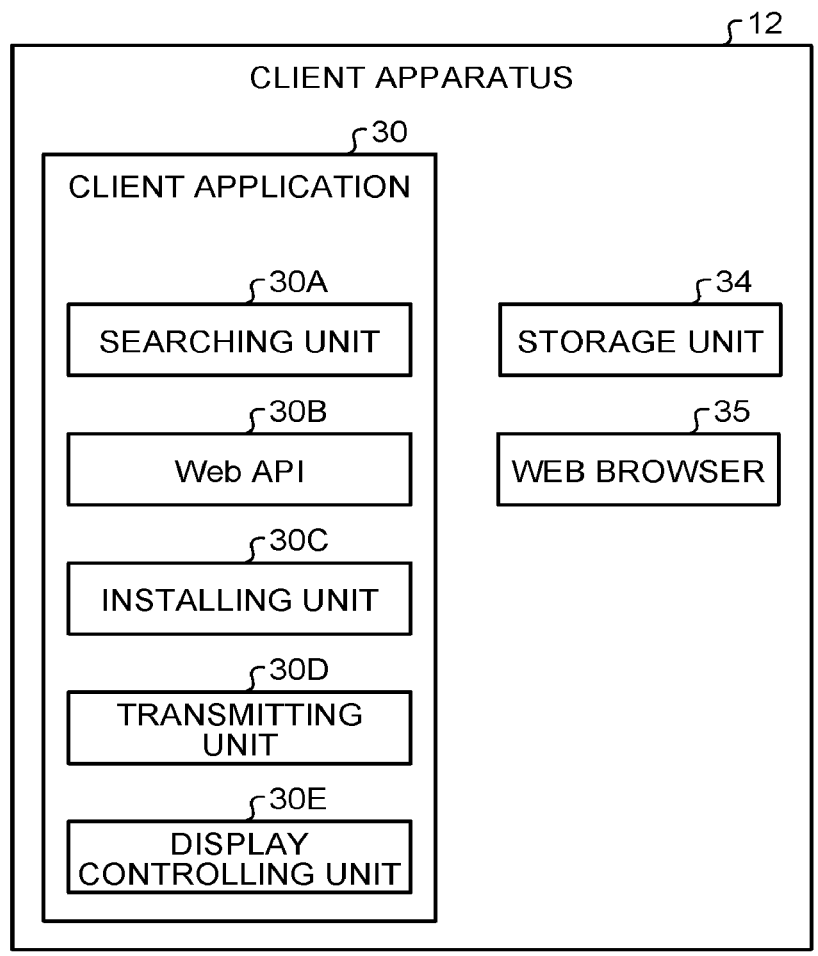
FIG. 4 is a diagram of an example of a data configuration of download request information.
FIG. 5 is a functional block diagram of a client apparatus.

FIG. 4 is a diagram of an example of a data configuration of the download request information. As illustrated in FIG. 4, the download request information acquired by the information processing apparatus 16 from the client apparatus 12 contains the IP address of the client apparatus 12, the device name (the specifying information), and the type of the language used in the device of the device name. FIG. 4 omits the description of the information on the OS.

Referring back to FIG. 3, the Web API 24B stores the download request information received from the client apparatus 12 in the storage unit 28. With this operation, the client information 28B is stored in the storage unit 28. The storage unit 28 stores therein the download request information until a download completion notification of the control program is transmitted to the client apparatus 12 specified by the client information 28B contained in the download request information.

The switching unit 24C switches the connection from the first network 20 to the second network 22. The receiver 24A then downloads the control program from the external apparatus 18 via the second network 22.

The Web API 24B transmits the control program downloaded by the receiver 24A to the client apparatus 12.

Specifically, the switching unit 24C switches the connection from the second network 22 to the first network 20. The Web API 24B then transmits the control program to the client apparatus 12 serving as the transmission source of the download request information. The Web API 24B reads the client information 28B (the IP address) of the client apparatus 12 contained in the download request information stored in the storage unit 28 and thereby specifies the client apparatus 12 serving as the transmission source of the download request information.

The Web API 24B may transmit the control program to all the client apparatuses 12 connected to the first network 20.

FIG. 5 is a functional block diagram of the client apparatus 12.

The client apparatus 12 includes the client application 30, a storage unit 34, and a web browser 35.

The client application 30 is an application program for acquiring the control program from the information processing apparatus 16. By executing the client application installer 28A, the client application 30 is installed on the client apparatus 12.

The client application 30 includes a searching unit 30A, a Web API 30B, an installing unit 30C, a transmitting unit 30D, and a display controlling unit 30E.

In the present embodiment, the processor of the client apparatus 12 executes the client application 30, whereby the searching unit 30A, the Web API 30B, the installing unit 30C, the transmitting unit 30D, and the display controlling unit 30E are loaded onto a main memory and are generated on the main memory.

The web browser 35 receives identification information (an IP address, for example) of the information processing apparatus 16 to be connected when the control program is acquired from the operating unit 62 of the client apparatus 12. The user operates the operating unit 62 to input the identification information of the information processing apparatus 16 via the web browser 35. The web browser 35 receives the identification information of the information processing apparatus 16 input by the operation on the operating unit 62.

The web browser 35 accesses the information processing apparatus 16 identified by the received identification information and downloads the client application installer 28A.

Upon reception of the identification information of the information processing apparatus 16 from the operating unit 62, the web browser 35 may display a display screen prepared by the server application 24 in the information processing apparatus 16 on the display 60 of the client apparatus 12. This display screen contains a button image indicating "start to install client application," for example. The web browser 35 may download the client application installer 28A from the information processing apparatus 16 when the display area of the button image is selected by the user. Furthermore, the web browser 35 may execute the client application installer 28A when receiving an instruction to execute the client application installer 28A through an operation instruction on the operating unit 62 by the user.

In the present embodiment, the processor of the client apparatus 12 executes the client application installer 28A downloaded from the information processing apparatus 16 and thereby installs the client application 30 on the client apparatus 12. The processor of the client apparatus 12 executes the client application 30, whereby the searching unit 30A, the Web API 30B, and the installing unit 30C are loaded onto the main memory and are generated on the main memory.

The client application 30 may have already been installed on the client apparatus 12. In this case, the web browser 35 may display, on the display 60, a list of pieces of identification information (IP addresses, for example) of the information processing apparatuses 16 to which the respective installed client applications 30 are connected. The web browser 35 may receive the identification information of the information processing apparatus 16 to be connected selected through an operation instruction on the operating unit 62 by the user from the displayed list of the pieces of identification information. The processor of the client apparatus 12 may execute the installed client application 30 corresponding to the information processing apparatus 16 to be connected selected by the user.

The searching unit 30A searches for all the devices (the printers 14 in the present embodiment) connected to the first network 20. The searching unit 30A searches the first network 20 and thereby obtains the device names of all the respective printers 14 connected to the first network 20 and the IP addresses of the printers 14. The searching unit 30A may be included in the server application 24 in the information processing apparatus 16.

The Web API 30B is a system that uses functions of another computer program from an external computer program using HTTP. In the present embodiment, the server application 24 in the information processing apparatus 16 makes use of the Web API 30B to use functions of the client application 30 in the client apparatus 12.

The transmitting unit 30D transmits the download request information to the information processing apparatus 16 identified by the identification information received by the web browser 35. As described above, the download request information contains the client information 28B (the IP address, for example) of the client apparatus 12, the device names of the respective printers 14 searched for by the searching unit 30A, and the information on the OS of the client apparatus 12. As described above, the download request information may further contain the types of the languages used in the devices of the device names contained in the download request information.

The display controlling unit 30E may display a list of the device names of the respective printers 14 searched for by the searching unit 30A on the display 60 and cause the user to select a device that uses the control program to be acquired. In this case, the web browser 35 displays the list of the device names of the printers 14 searched for by the searching unit 30A on the display 60. One or a plurality of device names are selected through an operation on the operating unit 62 by the user. The web browser 35 then receives the device name selected by the user from the operating unit 62. The Web API 30B may transmit the download request information containing the received device name to the information processing apparatus 16.

The Web API 30B receives the control program received by the information processing apparatus 16 from the external apparatus 18.

Specifically, the Web API 30B receives a download completion notification from the information processing apparatus 16. Upon reception of the download completion notification, the Web API 30B receives (that is, downloads) the control program from the information processing apparatus 16.

The installing unit 30C installs the control program received by the Web API 30B on the client apparatus 12. When the control program received by the Web API 30B is a printer driver, for example, the installing unit 30C installs the received printer driver on the client apparatus 12. At the time of installation, the installing unit 30C may set the printer driver using the IP addresses of the respective printers 14 searched for by the searching unit 30A.

Consequently, the control program of the latest version (a printer driver of the latest version, for example) is installed on the client apparatus 12. If the version of the control program that has already been installed is the same as the version of the control program of the corresponding device acquired from the information processing apparatus 16 or when the installed one is the latest version, the client apparatus 12 is not required to perform installation.

Figure 6:
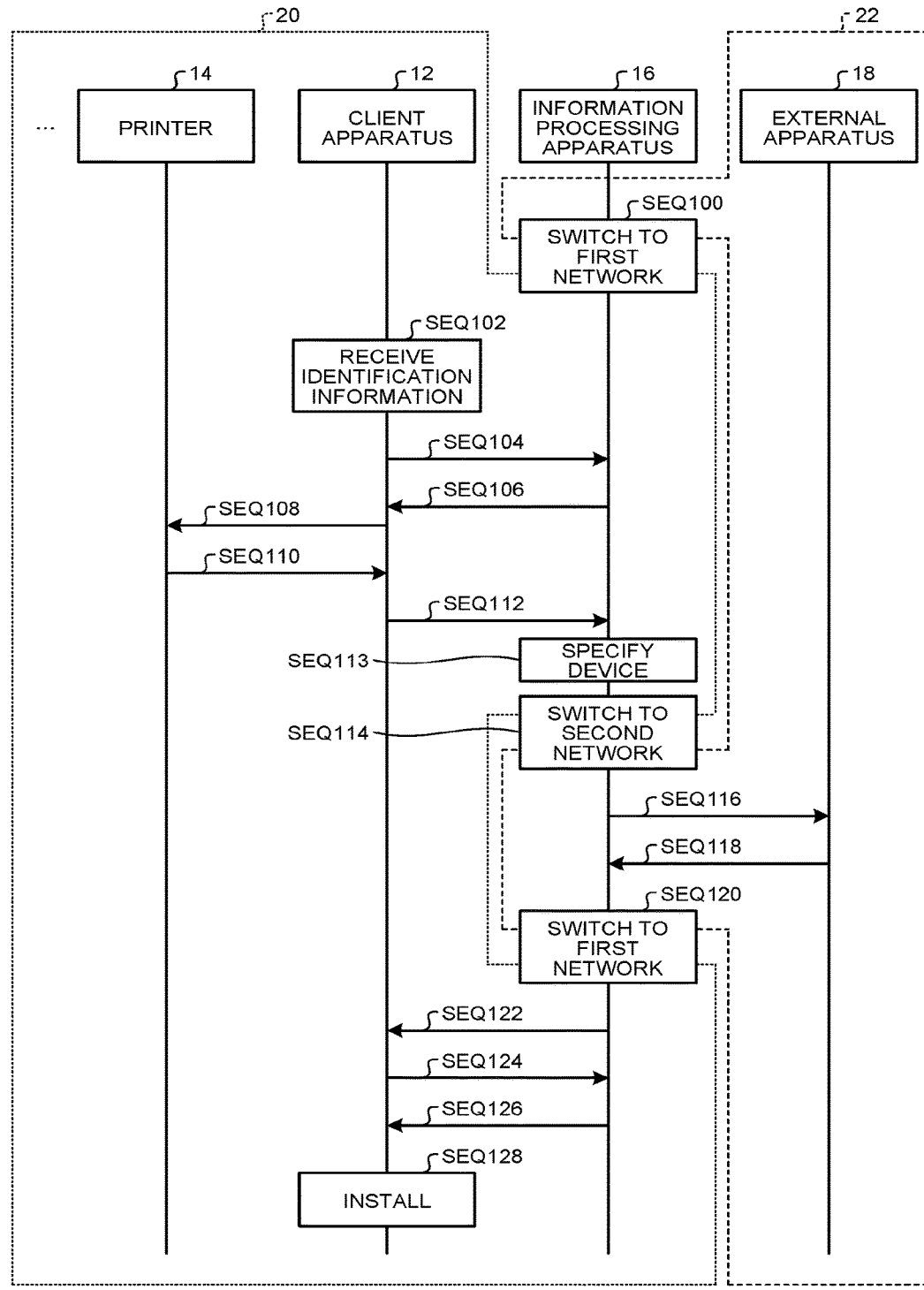
FIG. 6 is a sequence diagram of a procedure of information processing.

Next, a description will be given for a procedure of information processing performed by the information processing system 10. FIG. 6 is a sequence diagram of the procedure of the information processing executed by the information processing system 10.

First, the switching unit 24C of the information processing apparatus 16 switches connection from the second network 22 to the first network 20 (SEQ 100).

The switching unit 24C is required to determine which network is the first network 20 and which network is the second network 22 among a plurality of networks and to perform switching. For this determination, the following method may be used, for example.

The switching unit 24C may determine the first network 20 by the following method of determination, for example.

Specifically, the server application 24 stores therein information indicating which network is the first network 20 in advance. The server application 24 stores therein information (an SSID, a password, or the like) on an access point for connecting to the first network 20, for example. The switching unit 24C may determine the first network 20 using this information.

Alternatively, the server application 24 may display a display screen containing a list of networks as candidates of connection (that are receiving radio waves) on the display 60. In this case, the switching unit 24C may determine a network selected through an operation instruction on the operating unit 62 by the user to be the first network 20.

The switching unit 24C may determine the second network 22 by the following method.

The server application 24 stores therein information indicating which network is the second network 22 in advance, for example. The server application 24 stores therein information on mobile networks (cellular phone lines) such as 3G and LTE or access points of WiFi that can connect to the Internet as information indicating the second network 22 in advance, for example. The switching unit 24C may determine the second network 22 using this information.

Before switching the connection from the second network 22 to the first network 20 at SEQ 100, the switching unit 24C may store therein information on the network connected before the switching as the information on the second network 22.

Next, the web browser 35 of the client apparatus 12 receives the identification information of the information processing apparatus 16 to be connected when the control program is acquired from the operating unit 62 (SEQ 102). Next, the web browser 35 accesses the information processing apparatus 16 identified by the identification information received at SEQ 102 and downloads the client application installer 28A corresponding to the information processing apparatus 16 (SEQ 104 and SEQ 106).

The processor of the client apparatus 12 executes the client application installer 28A downloaded from the information processing apparatus 16 and thereby installs the client application 30 on the client apparatus 12. The processor of the client apparatus 12 executes the client application 30, whereby the searching unit 30A, the Web API 30B, and the installing unit 30C are loaded onto the main memory and are generated on the main memory.

Next, the searching unit 30A of the client apparatus 12 searches for all the devices (the printers 14 in the present embodiment) connected to the first network 20 (SEQ 108 and SEQ 110). With this search, the searching unit 30A obtains the device names of all the respective printers 14 connected to the first network 20 and the IP addresses of the respective printers 14.

Next, the transmitting unit 30D of the client apparatus 12 transmits the download request information of the control program containing the device names (the specifying information) retrieved at SEQ 108 and SEQ 110 to the information processing apparatus 16 identified by the identification information received by the web browser 35 at SEQ 102 (SEQ 112). As described above, the download request information transmitted at SEQ 112 contains the client information 28B (the IP address, for example) of the client apparatus 12, the device names of the respective printers 14 searched for by the searching unit 30A, and the information on the OS of the client apparatus 12.

The Web API 24B of the information processing apparatus 16 stores the download request information acquired from the client apparatus 12 in the storage unit 28. The specifying unit 24D of the information processing apparatus 16 specifies the printer 14 that can be controlled by the client apparatus 12 from the acquired download request information (SEQ 113). Next, the switching unit 24C switches the connection from the first network 20 to the second network 22 (SEQ 114). The determination of the first network 20 and the second network 22 by the switching unit 24C may be performed similarly to SEQ 100 described above.

Next, the Web API 24B of the information processing apparatus 16 acquires the control program (the printer driver, for example) for controlling the devices (the printers 14) corresponding to the respective device names from the external apparatus 18 connected to the second network 22 based on the device names and the information on the OS of the client apparatus 12 contained in the download request information received at SEQ 112 (SEQ 116 and SEQ 118). The receiver 24A stores the acquired control program in association with the corresponding download request information in the storage unit 28.

Next, the switching unit 24C switches the connection from the second network 22 to the first network 20 (SEQ 120). The determination of the first network 20 and the second network 22 by the switching unit 24C may be performed similarly to SEQ 100 described above. When the connection is switches at SEQ 114, the server application 24 may display a display screen (a user interface) that presents which network is connected to the user on the display 60.

Next, the Web API 24B of the information processing apparatus 16 transmits the download completion notification of the control program to the client apparatus 12 serving as the transmission source of the download request information received at SEQ 112 (SEQ 122).

Upon reception of the download completion notification from the information processing apparatus 16, the Web API 30B of the client apparatus 12 receives (that is, downloads) the control program from the information processing apparatus 16 (SEQ 124 and SEQ 126).

Next, the installing unit 30C of the client apparatus 12 installs the control program downloaded by the Web API 30B at SEQ 124 and SEQ 126 on the client apparatus 12 (SEQ 128). At the time of installation, the installing unit 30C sets the printer driver using the IP addresses of the respective printers 14 searched for by the searching unit 30A. The present sequence then ends.

As described above, the information processing apparatus 16 of the present embodiment connects to at least one client apparatus 12 via the first network 20 and can connect to the external apparatus 18 via the second network 22. The information processing apparatus 16 includes the Web API 24B (the first transmitting unit or receiving unit), the specifying unit 24D (the specifying unit), the switching unit 24C (the first switching unit or the second switching unit), and the receiver 24A (the second receiving unit).

The Web API 24B (the first receiving unit) receives the client information 28B related to the client apparatus 12 from the client apparatus 12 via the first network 20. The specifying unit 24D specifies the printer 14 (the device) that is connected to the first network 20 and can be controlled by the client apparatus 12. The switching unit 24C (the first switching unit) switches the connection from the first network 20 to the second network 22. The receiver 24A (the second receiving unit), based on the client information 28B and the printer 14 (the device) specified by the specifying unit 24D (the specifying unit), receives the control program for controlling the printer 14 (the device) from the external apparatus 18 via the second network 22. The switching unit 24C (the second switching unit) switches the connection from the second network 22 to the first network 20. The Web API 24B (the transmitting unit) transmits the control program received by the Web API 24B (the second receiving unit) to the client apparatus 12 via the first network 20.

Thus, in the information processing apparatus 16 of the present embodiment, an environment in which the client apparatus 12 is limited in terms of connection to the second network 22 is maintained, and the connection of the information processing apparatus 16 is switched between the first network 20 and the second network 22. When the connection is switched to the second network 22, the information processing apparatus 16 receives the control program from the external apparatus 18 via the second network 22. When the connection is switched from the second network 22 to the first network 20, the information processing apparatus 16 transmits the control program to the client apparatus 12 via the first network 20.

Consequently, the environment in which the client apparatus 12 cannot access the second network 22 (the external network) can be maintained. In addition, work when the control program is installed on the client apparatus 12 by the manager of the client apparatus 12 or the first network 20 can be reduced.

Consequently, the information processing apparatus 16 of the present embodiment can maintain the environment in which the connection from the client apparatus 12 to the second network 22 (the external network) is controlled (that is, the connection is limited) and reduce loads on the manager side when the control program is installed on the client apparatus 12.

The Web API 24B (the first receiving unit) further receives the specifying information of the printer 14 (the device) that is connected to the first network 20 and can be controlled by the client apparatus 12 from the client apparatus 12. The specifying unit 24D (the specifying unit) specifies the printer 14 (the device) specified by the specifying information to be the printer 14 (the device) that is connected to the first network 20 and can be controlled by the client apparatus 12.

The client apparatus 12 is connected to various printers 14 depending on conditions. Given this situation, the acquired control program differs by the client apparatus 12. The information processing apparatus 16 of the present embodiment has the above configuration, whereby the control program suitable for the client apparatus 12 is automatically installed without requiring the manager to manually install the control program such as a driver on the client apparatus 12. Consequently, in addition to the above effect, loads on the manager side can be further reduced.

The installing unit 30C (the installing unit) of the client apparatus 12 installs the control program received from the information processing apparatus 16 on the client apparatus 12.

In the information processing system 10 according to the present embodiment, the inputting of the identification information of the information processing apparatus 16 is the only operation by the user of the client apparatus 12 (refer to SEQ 102 in FIG. 6). Consequently, loads on the user (including the manager) can be reduced.

Consequently, the information processing apparatus 16 according to the present embodiment can maintain the environment in which the client apparatus 12 is limited in terms of connection to the second network 22 (the external network) and reduce loads on the manager side when the control program is installed on the client apparatus 12.

Preferably, the information processing apparatus 16 according to the present embodiment is portable. The device is an image forming apparatus such as the printer 14, for example. The control program is the printer driver, for example.

The information processing apparatus 16 such as a mobile device that can connect to networks, in an environment in which a plurality of Wifi and a cellular phone line such as 4G are mixed, basically connects to only either one of the networks to perform communication. In other words, with Wifi connection as the first network 20 and with the cellular phone line such as 4G as the second network 22, when the information processing apparatus 16 is connected to the second network 22, the client application 30 in the client apparatus 12 connected to only the first network 20 cannot connect to the server application 24 in the information processing apparatus 16. In this case, the switching unit 24C of the client apparatus 12 switches the connection from the second network 22 to the first network 20, whereby the client application 30 in the client apparatus 12 can connect to the server application 24 in the information processing apparatus 16.

To which network the information processing apparatus 16 connects is determined by the setting (default network setting or the setting of network connection priority) of the OS of the information processing apparatus 16. In the present embodiment, the switching unit 24C of the information processing apparatus 16 can switch the connection using a function of the OS.

Second Embodiment

Next, the following describes an information processing system according to a second embodiment.

FIG. 1 is a diagram of an example of an information processing system 11 according to the present embodiment.

The information processing system 11 includes a client apparatus 13 and an information processing apparatus 17.

The information processing system 11 may include a plurality of client apparatuses 13. The information processing system 11 may include a plurality of information processing apparatuses 17. The client apparatuses 13 are connected to devices such as the printer 14 via the first network 20.

The first network 20 and the printer 14 are the same as or similar to those according to the first embodiment. In the present embodiment, a description will be given for a case in which the device connected to the first network 20 is the printer 14 as an example.

The client apparatuses 13 are not connected to the second network 22. The external apparatus 18 is connected to the second network 22. The external apparatus 18 and the second network 22 are the same as or similar to those according to the first embodiment. In other words, the client apparatus 13 can connect to the devices connected to the first network 20 and the other client apparatus 13. However, the client apparatuses 13 cannot connect to the second network 22.

The information processing apparatus 17 is connected to the client apparatuses 13 via the first network 20 and is connected to the external apparatus 18 via the second network 22. In other words, the information processing apparatus 17 can connect to both the client apparatuses 13 and the second network 22. However, the information processing apparatus 17 cannot connect to both the client apparatuses 13 and the second network 22 simultaneously.

Next, the following describes a hardware configuration of the client apparatus 13, the information processing apparatus 17, and the external apparatus 18 according to the present embodiment.

FIG. 2 is a diagram of an example of the hardware configuration of the client apparatus 13, the information processing apparatus 17, and the external apparatus 18 according to the present embodiment.

The client apparatus 13, the information processing apparatus 17, and the external apparatus 18 according to the present embodiment each include the CPU 50, the RAM 52, the ROM 54, the HDD 56, and the I/F 58. The CPU 50, the RAM 52, the ROM 54, the HDD 56, and the I/F 58 are connected to each other via the bus 64. The display 60 and the operating unit 62 are connected to the I/F 58. The CPU 50, the RAM 52, the ROM 54, the HDD 56, the I/F 58, the bus 64, the display 60, and the operating unit 62 are the same as or similar to those according to the first embodiment.

Figure 7:
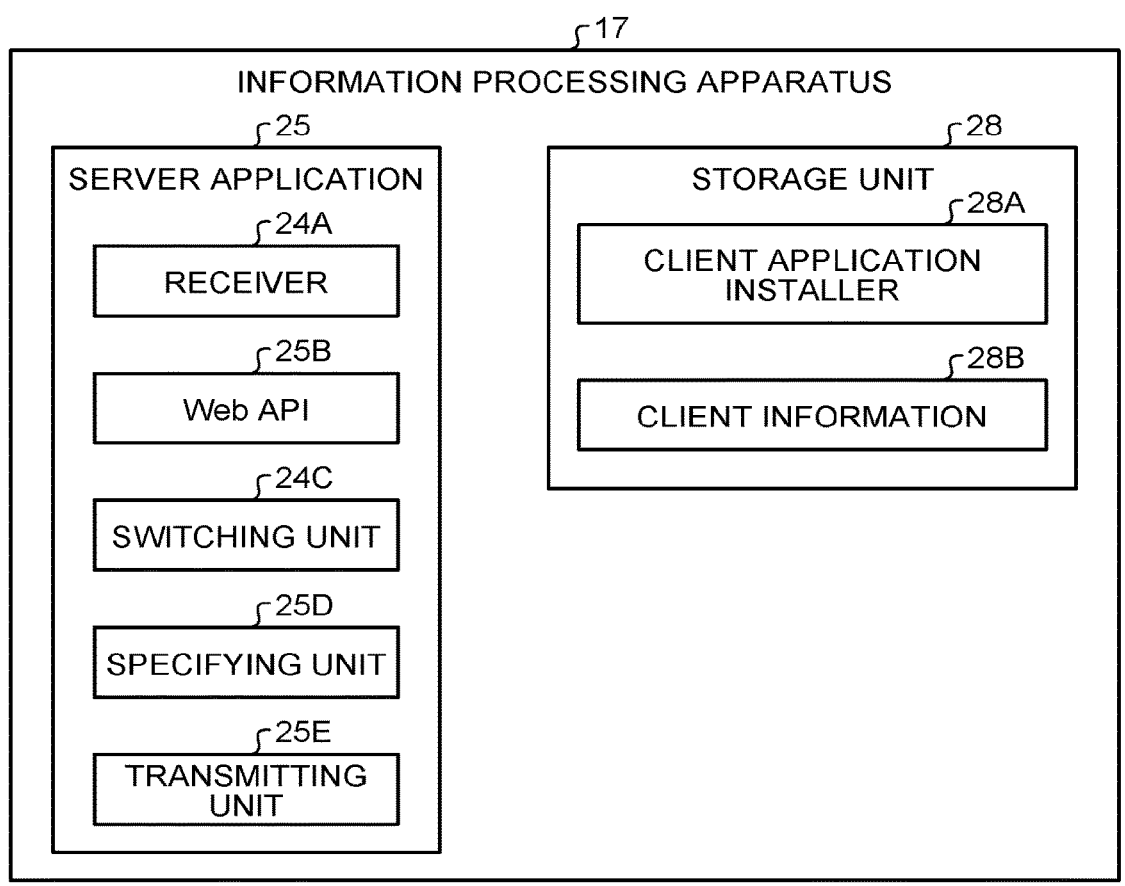
FIG. 7 is a functional block diagram of an information processing apparatus.

FIG. 7 is a functional block diagram of the information processing apparatus 17.

The information processing apparatus 17 includes a server application 25 and the storage unit 28. The storage unit 28 is the same as or similar to that according to the first embodiment.

The server application 25 is an application program for acquiring the control program from the external apparatus 18 and transmitting the control program to the client apparatus 13. The server application 25 is installed on the information processing apparatus 17 in advance.

The server application 25 includes the receiver 24A (the second receiving unit), a Web API 25B (the first receiving unit), the switching unit 24C (the first switching unit or the second switching unit), a specifying unit 25D (the specifying unit), and a transmitting unit 25E (the transmitting unit).

In the present embodiment, the processor of the information processing apparatus 17 executes the server application 25, whereby the receiver 24A, the Web API 25B, the switching unit 24C, and the specifying unit 25D are loaded onto a main memory and are generated on the main memory, for example.

The switching unit 24C and the receiver 24A are the same as or similar to those according to the first embodiment.

The specifying unit 25D specifies the printer 14 (the device) that is connected to the first network 20 and can be controlled by the client apparatus 13. This specification of the printer 14 (the device) is the same as or similar to that by the specifying unit 24D according to the first embodiment.

In the present embodiment, the specifying unit 25D further specifies the client apparatus 13 on which a client application 31 (refer to FIG. 8) for acquiring the control program from the information processing apparatus 17 has been installed among the client apparatuses 13. The client application 31 is an application program for causing the client apparatus 13 to acquire the control program from the information processing apparatus 17 similarly to the client application 30 according to the first embodiment.

The specifying unit 25D calls a Web API 31B (refer to FIG. 8) for the client application 31 to the client apparatus 13 connected to a network the subnet of which is the same (the first network 20), for example. When the Web API 31B is successfully called, the specifying unit 25D determines the client apparatus 13 to be the client apparatus 13 on which the client application 31 has been installed. Success in the calling of the Web API 31B (refer to FIG. 8) for the client application 31 means a state in which a response is returned from the client apparatus 13 to a request from the server application 25.

When the information processing system 11 includes a plurality of information processing apparatuses 17, the client application 31 is present for each of the information processing apparatuses 17. In other words, the client application 31 for acquiring the control program from the external apparatus 18 is present for each of the information processing apparatuses 17. Given this situation, each of the information processing apparatuses 17 stores the client application installer 28A of the client application 31 for each of the information processing apparatuses 17 in the storage unit 28 in advance.

Consequently, the specifying unit 25D specifies the client apparatus 13 on which the client application 31 for the information processing apparatus 17 has been installed.

The Web API 25B is the same as or similar to the Web API 24B according to the first embodiment.

The transmitting unit 25E transmits identification information (an IP address, for example) of the information processing apparatus 17 and a transmission request of download request information of the control program to the client apparatus 13 specified by the specifying unit 25D. The download request information is the same as or similar to that according to the first embodiment.

Consequently, in the present embodiment, the client apparatus 13 can transmit the download request information to the information processing apparatus 17 identified by the identification information received from the information processing apparatus 17 without receiving any operation by the user with respect to the identification information of the information processing apparatus 17.

Figure 8:
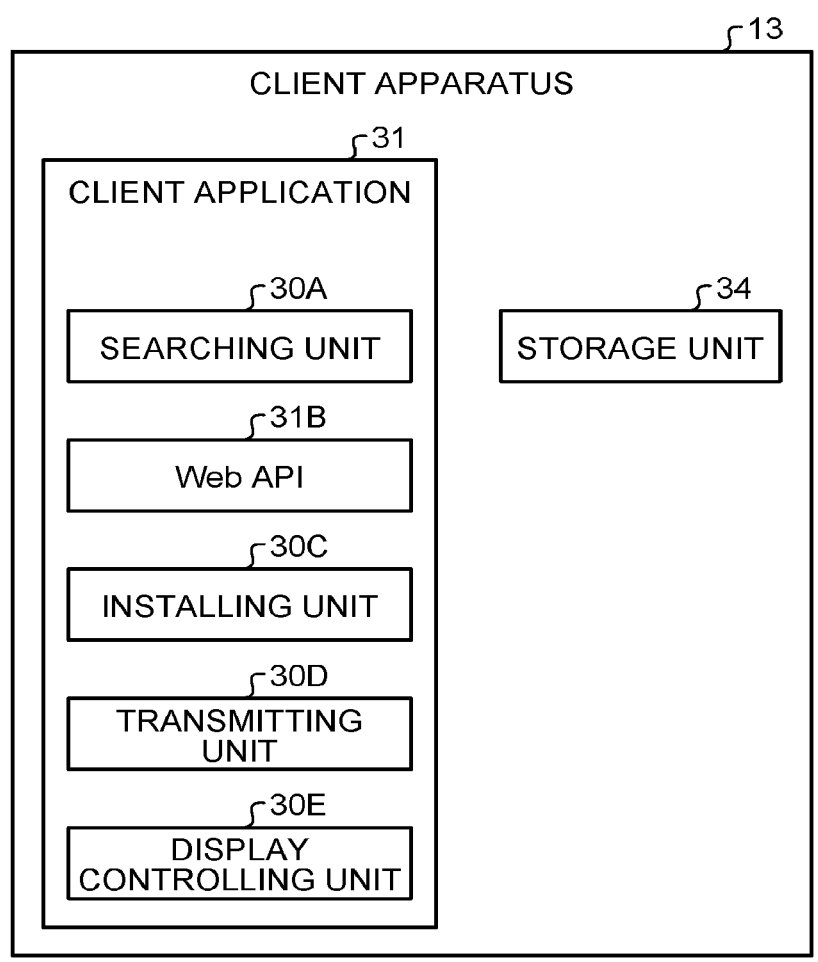
FIG. 8 is a functional block diagram of a client apparatus.

FIG. 8 is a functional block diagram of the client apparatus 13 according to the present embodiment.

The client apparatus 13 includes the client application 31 and the storage unit 34.

The client application 31 is an application program for acquiring the control program from the information processing apparatus 17 similarly to the client application 30 according to the first embodiment. By executing the client application installer 28A, the client application 31 is installed on the client apparatus 13.

The client application 31 includes the searching unit 30A, the Web API 31B, the installing unit 30C, the transmitting unit 30D, and the display controlling unit 30E.

In the present embodiment, the processor of the client apparatus 13 executes the client application 31, whereby the searching unit 30A, the Web API 31B, the installing unit 30C, the transmitting unit 30D, and the display controlling unit 30E are loaded onto a main memory and are generated on the main memory. The searching unit 30A, the installing unit 30C, the transmitting unit 30D, and the display controlling unit 30E are the same as or similar to those according to the first embodiment.

The Web API 31B receives the identification information of the information processing apparatus 17 and the transmission request of the download request information of the control program from the information processing apparatus 17. In other words, in the first embodiment, the web browser 35 of the client apparatus 12 receives the identification information of the information processing apparatus 16 from the operating unit 62 (refer to FIG. 5). In contrast, in the present embodiment, in the client application 31, the Web API 31B receives the identification information of the information processing apparatus 17 from the information processing apparatus 17.

When receiving the identification information of the information processing apparatus 17 and the transmission request, the transmitting unit 30D transmits the download request information to the information processing apparatus 17 identified by the identification information.

Consequently, in the present embodiment, the user who operates the client apparatus 13 is not required to operate the operating unit 62 of the client apparatus 13 for the purpose of inputting the identification information of the information processing apparatus 17 to be connected when the control program is acquired.

Figure 9:
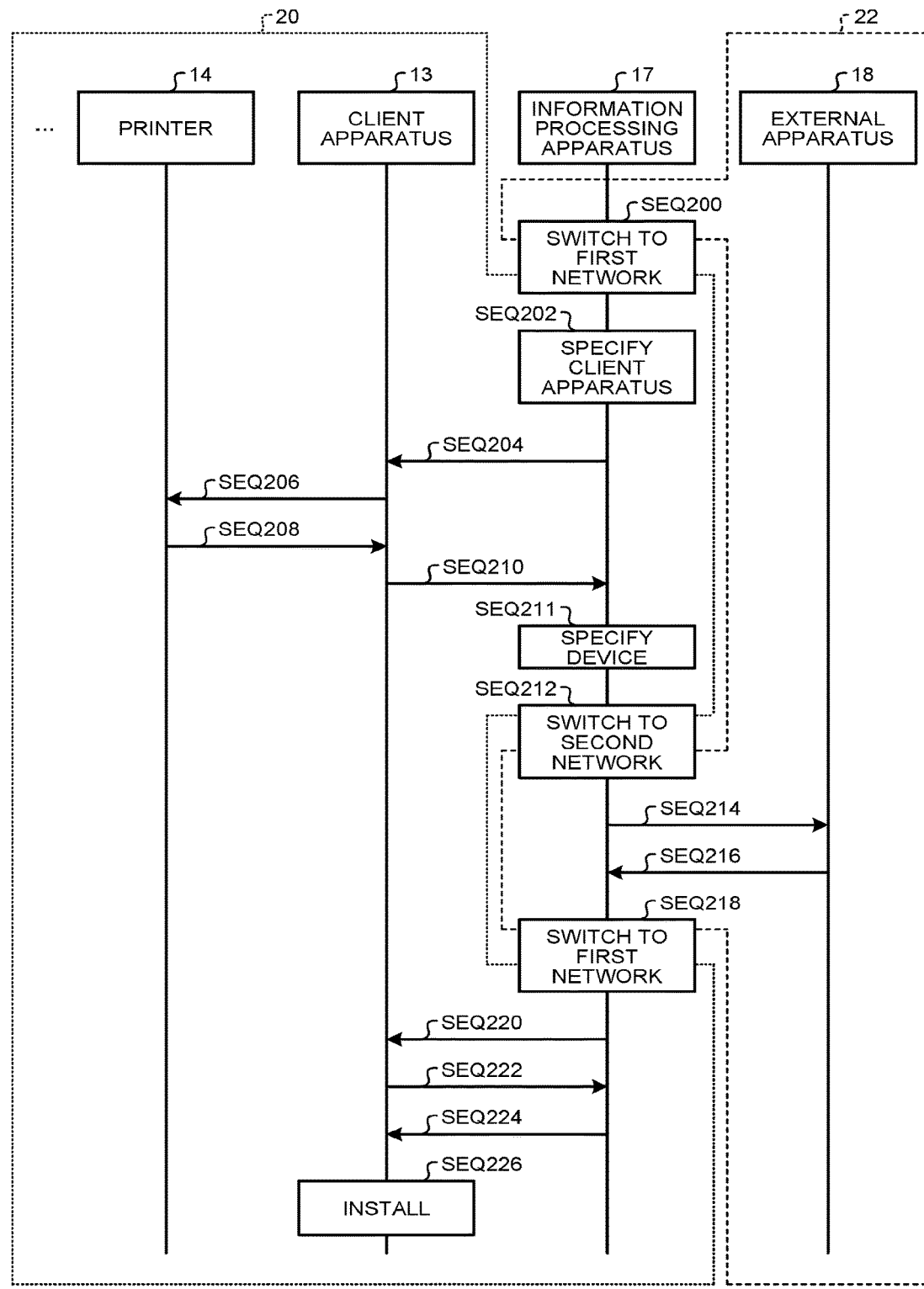
FIG. 9 is a sequence diagram of a procedure of information processing.

Next, the following describes a procedure of information processing executed by the information processing system 11. FIG. 9 is a sequence diagram of the procedure of the information processing executed by the information processing system 11.

First, the switching unit 24C of the information processing apparatus 17 switches connection from the second network 22 to the first network 20 (SEQ 200). The determination of the first network 20 and the second network 22 by the switching unit 24C is performed similarly to SEQ 100 described above (refer to FIG. 6).

Next, the specifying unit 25D of the information processing apparatus 17 specifies the client apparatus 13 on which the client application 31 corresponding to the information processing apparatus 17 has been installed among the client apparatuses 13 connected to the first network 20 (SEQ 202).

Next, the transmitting unit 25E of the information processing apparatus 17 transmits the identification information (the IP address, for example) of the information processing apparatus 17 and the transmission request of the download request information of the control program to the client apparatus 13 specified at SEQ 202 (SEQ 204).

The information processing system 11 executes the processing of SEQ 206 to SEQ 226 similarly to SEQ 108 to SEQ 128 (refer to FIG. 6) in the information processing system 10 according to the first embodiment.

Specifically, the searching unit 30A of the client apparatus 13 searches for all the devices (the printers 14) connected to the first network 20 (SEQ 206 and SEQ 208). With this search, the searching unit 30A obtains the device names of all the respective printers 14 connected to the first network 20 and the IP addresses of the respective printers 14.

Next, the transmitting unit 30D of the client apparatus 13 transmits the download request information of the control program containing the device names (the specifying information) searched at SEQ 206 and SEQ 208 to the information processing apparatus 17 identified by the identification information acquired from the information processing apparatus 17 at SEQ 204 (SEQ 210). As described above, the download request information transmitted at SEQ 210 contains the client information 28B (the IP address, for example) of the client apparatus 13, the device names of the respective printers 14 searched for by the searching unit 30A, and the information on the OS of the client apparatus 13.

The Web API 25B of the information processing apparatus 17 stores the download request information acquired from the client apparatus 13 in the storage unit 28. The specifying unit 25D of the information processing apparatus 17 specifies the printer 14 that can be controlled by the client apparatus 13 from the acquired download request information (SEQ 211). Next, the switching unit 24C switches the connection from the first network 20 to the second network 22 (SEQ 212). The determination of the first network 20 and the second network 22 by the switching unit 24C is performed similarly to SEQ 100 described above (refer to FIG. 6).

Next, the Web API 25B of the information processing apparatus 17 acquires the control program (the printer driver, for example) for controlling the devices (the printers 14) corresponding to the respective device names from the external apparatus 18 connected to the second network 22 based on the device names and the information on the OS of the client apparatus 13 contained in the download request information received at SEQ 210 (SEQ 214 and SEQ 216). The receiver 24A stores the acquired control program in association with the corresponding download request information in the storage unit 28.

Next, the switching unit 24C switches the connection from the second network 22 to the first network 20 (SEQ 218). The determination of the first network 20 and the second network 22 by the switching unit 24C is performed similarly to SEQ 100 described above (refer to FIG. 6).

Next, the Web API 25B of the information processing apparatus 17 transmits a download completion notification of the control program to the client apparatus 13 as the transmission source of the download request information received at SEQ 210 (SEQ 220).

Upon reception of the download completion notification from the information processing apparatus 17, the Web API 31B of the client apparatus 13 receives (that is, downloads) the control program from the information processing apparatus 17 (SEQ 222 and SEQ 224).

Next, the installing unit 30C of the client apparatus 13 installs the control program downloaded by the Web API 31B at SEQ 222 and SEQ 224 on the client apparatus 13 (SEQ 226). At the time of installation, the installing unit 30C sets the printer driver using the IP addresses of the respective printers 14 searched for by the searching unit 30A. The present sequence then ends.

As described above, in the information processing apparatus 17 according to the present embodiment, the specifying unit 25D (the specifying unit) further specifies the client apparatus 13 on which the client application 31 for acquiring the control program from the information processing apparatus 17 has been installed among the client apparatuses 13. The transmitting unit 25E (the transmitting unit) transmits the identification information of the information processing apparatus 17 and the transmission request of the download request information of the control program to the specified client apparatus 13.

Consequently, the client apparatus 13 can transmit the download request information to the information processing apparatus 17 identified by the identification information received from the information processing apparatus 17 without any operation instruction by the user.

In other words, in the information processing system 11 according to the present embodiment, the user (including also the manager) who operates the client apparatus 13 is not required to operate the operating unit 62 of the client apparatus 13 for the purpose of inputting the identification information of the information processing apparatus 17 to be connected when the control program is acquired.

Consequently, the information processing apparatus 17 according to the present embodiment can further reduce loads on the manager side when the control program is installed on the client apparatus 13 in addition to the effects according to the first embodiment.

Third Embodiment

In the present embodiment, the client application of the latest version can be used by the client apparatus 15.

FIG. 1 is a diagram of an example of an information processing system 9 according to the present embodiment.

The information processing system 9 includes a client apparatus 15 and an information processing apparatus 19.

The information processing system 9 may include a plurality of client apparatuses 15. The information processing system 9 may include a plurality of information processing apparatuses 19.

The client apparatuses 15 are connected to devices such as the printer 14 via the first network 20. The first network 20 and the printer 14 are the same as or similar to those according to the first embodiment.

The client apparatuses 15 are not connected to the second network 22. The external apparatus 18 is connected to the second network 22. The external apparatus 18 and the second network 22 are the same as or similar to those according to the first embodiment. In other words, the client apparatus 15 can connect to the devices connected to the first network 20 and the other client apparatus 15. However, the client apparatuses 15 cannot connect to the second network 22.

The information processing apparatus 19 is connected to the client apparatuses 15 via the first network 20 and is connected to the external apparatus 18 via the second network 22. In other words, the information processing apparatus 19 can connect to both the client apparatuses 15 and the second network 22. However, the information processing apparatus 19 cannot connect to both the client apparatuses 15 and the second network 22 simultaneously.

Next, the following describes a hardware configuration of the client apparatus 15, the information processing apparatus 19, and the external apparatus 18 according to the present embodiment.

FIG. 2 is a diagram of an example of the hardware configuration of the client apparatus 15, the information processing apparatus 19, and the external apparatus 18 according to the present embodiment.

The client apparatus 15, the information processing apparatus 19, and the external apparatus 18 according to the present embodiment each include the CPU 50, the RAM 52, the ROM 54, the HDD 56, and the I/F 58. The CPU 50, the RAM 52, the ROM 54, the HDD 56, and the I/F 58 are connected to each other via the bus 64. The display 60 and the operating unit 62 are connected to the I/F 58. The CPU 50, the RAM 52, the ROM 54, the HDD 56, the I/F 58, the bus 64, the display 60, and the operating unit 62 are the same as or similar to those according to the first embodiment.

Figure 10:
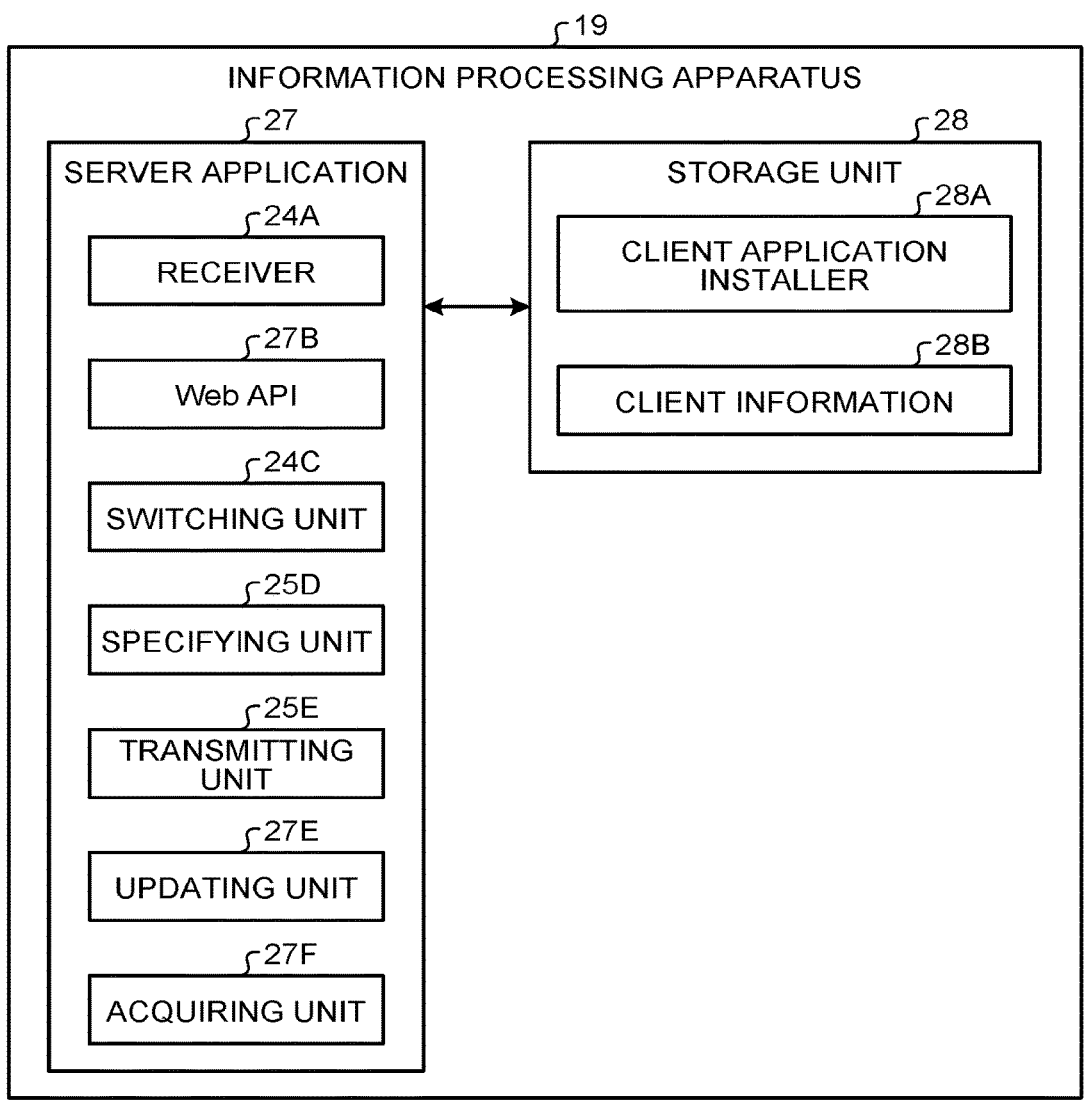
FIG. 10 is a functional block diagram of an information processing apparatus.

FIG. 10 is a functional block diagram of the information processing apparatus 19.

The information processing apparatus 19 includes a server application 27 and the storage unit 28. The storage unit 28 is the same as or similar to that according to the first embodiment.

The server application 27 is an application program for acquiring the control program from the external apparatus 18 and transmitting the control program to the client apparatus 15. The server application 27 is installed on the information processing apparatus 19 in advance.

The server application 27 includes the receiver 24A (the second receiving unit), a Web API 27B (the first receiving unit), the switching unit 24C (the first switching unit or the second switching unit), the specifying unit 25D (the specifying unit), the transmitting unit 25E (the transmitting unit), an updating unit 27E, and an acquiring unit 27F.

In the present embodiment, the processor of the information processing apparatus 19 executes the server application 27, whereby the receiver 24A, the Web API 27B, the switching unit 24C, the specifying unit 25D, the transmitting unit 25E, the updating unit 27E, and the acquiring unit 27F are loaded onto a main memory and are generated on the main memory, for example.

The switching unit 24C and the receiver 24A are the same as or similar to those according to the first embodiment. The specifying unit 25D and the transmitting unit 25E are the same as or similar to those according to the second embodiment.

The acquiring unit 27F acquires a client application 36 of the latest version (refer to FIG. 11) from the external apparatus 18. The client application 36 is an application program for causing the client apparatus 15 to acquire the control program from the information processing apparatuses 19 similarly to the client application 30

It is assumed that the external apparatus 18 stores therein the client application 36 of the latest version. The acquiring unit 27F of the information processing apparatuses 19 acquires the version of the client application 36 stored in the external apparatus 18 from the external apparatus 18 via the second network 22

The acquiring unit 27F reads the version of the client application 36 contained in the client application installer 28A stored in the storage unit 28 of the information processing apparatuses 19. If the version acquired from the external apparatus 18 is newer than the version of the client application 36 contained in the client application installer 28A stored in the storage unit 28, the acquiring unit 27F acquires the client application 36 of the latest version from the external apparatus 18.

The updating unit 27E updates the client application 36 stored in the storage unit 28 to the client application 36 of the latest version acquired by the acquiring unit 27F.

In the present embodiment, the acquiring unit 27F downloads the client application installer 28A of the client application 36 of the latest version from the external apparatus 18. The updating unit 27E updates the client application installer 28A stored in the storage unit 28 to the client application installer 28A of the client application 36 of the latest version.

The Web API 27B is the same as or similar to the Web API 25B according to the second embodiment. In the present embodiment, the Web API 27B (the first receiving unit) further receives from the client apparatus 15 specified by the specifying unit 25D (the specifying unit) via the first network 20 the version of the client application 36 installed on the client apparatus 15. If the version received by the Web API 27B (the first receiving unit) is older than the latest version acquired by the acquiring unit 27F, the transmitting unit 25E (the transmitting unit) transmits, to the client apparatus 15 via the first network 20, update instruction information that instructs updating to the client application 36 of the latest version.

Figure 11:
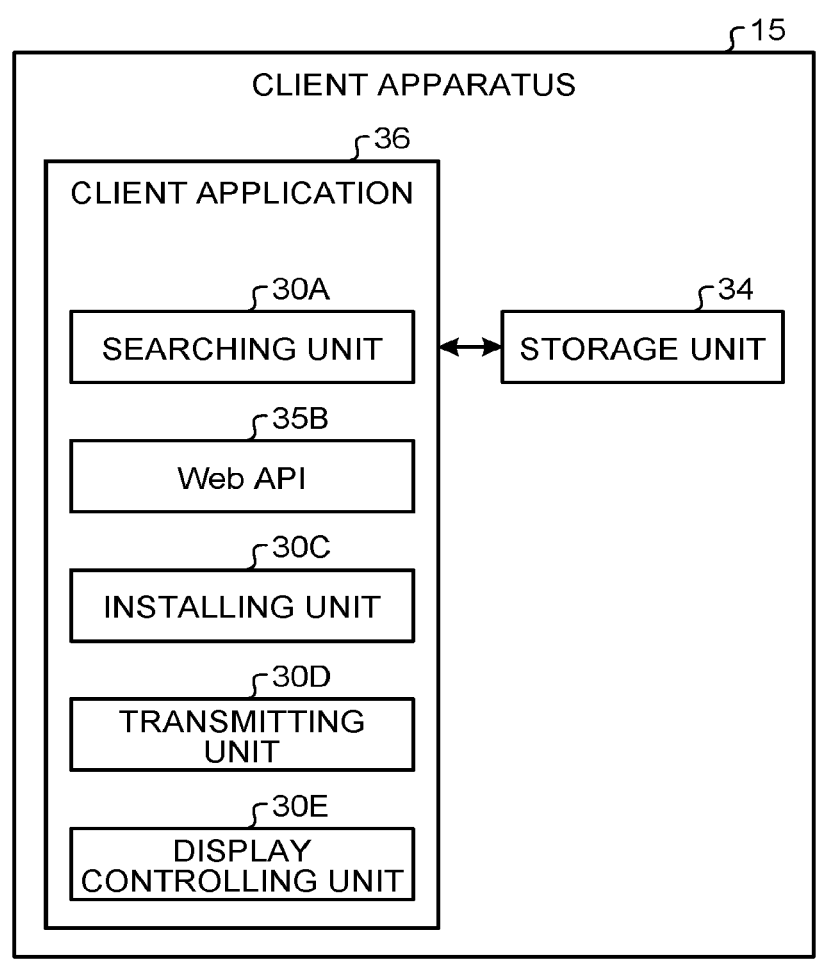
FIG. 11 is a functional block diagram of a client apparatus.

Next, the following describes functions of the client apparatus 15. FIG. 11 is a functional block diagram of the client apparatus 15 according to the present embodiment.

The client apparatus 15 includes the client application 36 and the storage unit 34.

The client application 36 is an application program for acquiring the control program from the information processing apparatus 19 similarly to the client application 30 according to the first embodiment. By executing the client application installer 28A, the client application 36 is installed on the client apparatus 15.

The client application 36 includes the searching unit 30A, a Web API 35B, the installing unit 30C, the transmitting unit 30D, and the display controlling unit 30E.

In the present embodiment, the processor of the client apparatus 15 executes the client application 36, whereby the searching unit 30A, the Web API 35B, the installing unit 30C, the transmitting unit 30D, and the display controlling unit 30E are loaded onto a main memory and are generated on the main memory. The searching unit 30A, the installing unit 30C, the transmitting unit 30D, and the display controlling unit 30E are the same as or similar to those according to the first embodiment.

The Web API 35B is the same as or similar to the Web API 31B according to the second embodiment. In the present embodiment, the Web API 35B further receives the update instruction information that instructs updating to the client application 36 of the latest version from the information processing apparatus 19. The Web API 35B then downloads the client application installer 28A of the latest client application 36 from the information processing apparatus 19 and executes the client application installer 28A. With this operation, the client application 36 of the client apparatus 15 is updated to the latest version.

Figure 12:
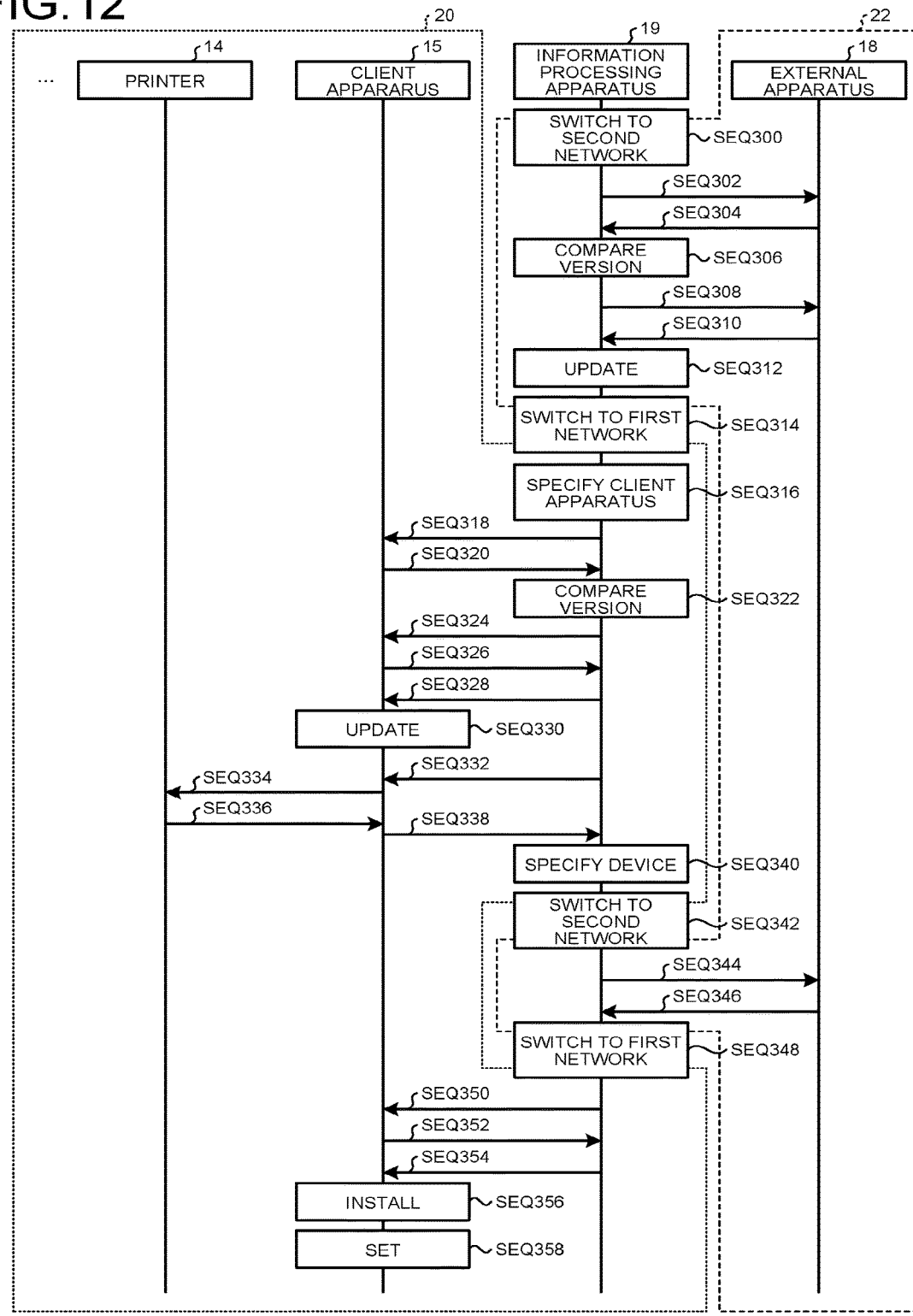
FIG. 12 is a sequence diagram of a procedure of information processing.

Next, the following describes a procedure of information processing executed by the information processing system 9. FIG. 12 is a sequence diagram of the procedure of the information processing executed by the information processing system 9.

First, the switching unit 24C of the information processing apparatus 19 switches connection from the first network 20 to the second network 22 (SEQ 300). The determination of the first network 20 and the second network 22 by the switching unit 24C is performed similarly to SEQ 100 described above (refer to FIG. 6).

Next, the acquiring unit 27F of the information processing apparatus 19 accesses the external apparatus 18 and acquires the version of the client application 36 stored in the external apparatus 18 (SEQ 302 and SEQ 304). The acquiring unit 27F of the information processing apparatus 19 compares the version of the client application 36 contained in the client application installer 28A stored in the storage unit 28 of the information processing apparatus 19 with the version acquired from the external apparatus 18 (SEQ 306).

If the version acquired from the external apparatus 18 is newer than the version of the client application 36 contained in the client application installer 28A stored in the storage unit 28, the acquiring unit 27F of the information processing apparatus 19 acquires the client application 36 of the latest version from the external apparatus 18 (SEQ 308 and SEQ 310). In the present embodiment, as described above, the acquiring unit 27F downloads the client application installer 28A of the client application 36 of the latest version from the external apparatus 18.

The updating unit 27E of the information processing apparatus 19 updates the client application installer 28A stored in the storage unit 28 to the client application installer 28A of the client application 36 of the latest version (SEQ 312).

Next, the switching unit 24C of the information processing apparatus 19 switches the connection from the second network 22 to the first network 20 (SEQ 314). The determination of the first network 20 and the second network 22 by the switching unit 24C is performed similarly to SEQ 100 described above (refer to FIG. 6).

Next, the specifying unit 25D of the information processing apparatus 19 specifies the client apparatus 15 on which the client application 36 corresponding to the information processing apparatus 19 has been installed among the client apparatuses 15 connected to the first network 20 (SEQ 316).

Next, the Web API 27B of the information processing apparatus 19 receives from the client apparatus 15 specified at SEQ 316 the version of the client application 36 installed on the client apparatus 15 (SEQ 318 and SEQ 320). The Web API 27B compares the version received at SEQ 320 with the version of the client application 36 of the client application installer 28A stored in the storage unit (SEQ 322).

If the version of the client application 36 installed on the client apparatus 15 is older than the version of the client application 36 of the client application installer 28A in the storage unit 28, the Web API 27B transmits to the client apparatus 15 the update instruction information that instructs updating to the client application 36 of the latest version (SEQ 324).

The Web API 35B of the client apparatus 15 downloads the client application installer 28A of the client application 36 of the latest version from the information processing apparatus 19 (SEQ 326 and SEQ 328). The Web API 35B then executes the downloaded client application installer 28A. With this operation, the client application 36 of the client apparatus 15 is updated to the latest version (SEQ 330).

The information processing system 9 executes the processing of SEQ 332 to SEQ 356 similarly to SEQ 204 to SEQ 226 (refer to FIG. 9) according to the second embodiment.

In other words, the transmitting unit 25E of the information processing apparatus 19 transmits identification information (an IP address, for example) of the information processing apparatus 19 and a transmission request of download request information of the control program to the client apparatus 15 specified at SEQ 316 (SEQ 332).

The searching unit 30A of the client apparatus 15 then searches for all the devices (the printers 14) connected to the first network 20 (SEQ 334 and SEQ 336). With this search, the searching unit 30A obtains the device names of all the respective printers 14 connected to the first network 20 and the IP addresses of the respective printers 14.

Next, the transmitting unit 30D of the client apparatus 15 transmits the download request information of the control program containing the device names (the specifying information) searched at SEQ 334 and SEQ 336 to the information processing apparatus 19 identified by the identification information acquired from the information processing apparatus 19 at SEQ 332 (SEQ 338). As described above, the download request information transmitted at SEQ 338 contains the client information 28B (the IP address, for example) of the client apparatus 15, the device names of the respective printers 14 searched for by the searching unit 30A, and the information on the OS of the client apparatus 15.

The Web API 27B of the information processing apparatus 19 stores the download request information acquired from the client apparatus 15 in the storage unit 28. The specifying unit 25D of the information processing apparatus 19 specifies the printer 14 that can be controlled by the client apparatus 15 from the acquired download request information (SEQ 340). Next, the switching unit 24C switches the connection from the first network 20 to the second network 22 (SEQ 342). The determination of the first network 20 and the second network 22 by the switching unit 24C is performed similarly to SEQ 100 described above (refer to FIG. 6).

Next, the Web API 27B of the information processing apparatus 19 acquires the control program (the printer driver, for example) for controlling the devices (the printers 14) corresponding to the respective device names from the external apparatus 18 connected to the second network 22 based on the device names and the information on the OS of the client apparatus 15 contained in the download request information received at SEQ 338 (SEQ 344 and SEQ 346). The receiver 24A stores the acquired control program in association with the corresponding download request information in the storage unit 28.

Next, the switching unit 24C switches the connection from the second network 22 to the first network 20 (SEQ 348). The determination of the first network 20 and the second network 22 by the switching unit 24C is performed similarly to SEQ 100 described above (refer to FIG. 6).

Next, the Web API 27B of the information processing apparatus 19 transmits a download completion notification of the control program to the client apparatus 15 as the transmission source of the download request information received at SEQ 338 (SEQ 350).

Upon reception of the download completion notification from the information processing apparatus 19, the Web API 35B of the client apparatus 15 receives (that is, downloads) the control program from the information processing apparatus 19 (SEQ 352 and SEQ 354).

Next, the installing unit 30C of the client apparatus 15 installs the control program downloaded by the Web API 35B at SEQ 352 and SEQ 354 on the client apparatus 15 (SEQ 356). At the time of installation, the installing unit 30C sets the printer driver using the IP addresses of the respective printers 14 searched for by the searching unit 30A (SEQ 358). The present sequence then ends.

As describes above, the information processing apparatus 19 according to the present embodiment further includes the acquiring unit 27F (an acquiring unit) and the updating unit 27E (an updating unit). The acquiring unit 27F acquires the client application 36 of the latest version from the external apparatus 18. The updating unit 27E updates the installed client application 36 to the acquired client application 36 of the latest version.

Consequently, the information processing apparatus 19 according to the present embodiment can easily update the client application 36 to the client application 36 of the latest version in addition to the effects according to the first embodiment and the second embodiment.

The Web API 27B (the first receiving unit) of the information processing apparatus 19 further receives from the client apparatus 15 specified by the specifying unit 25D (the specifying unit) via the first network 20 the version of the client application 36 installed on the client apparatus 15. If the version received by the Web API 27B (the first receiving unit) is older than the latest version acquired by the acquiring unit 27F, the Web API 27B (the transmitting unit) transmits to the client apparatus 15 via the first network 20 the update instruction information that instructs updating to the client application 36 of the latest version.

Consequently, the information processing apparatus 19 according to the present embodiment can update the client application 36 of the client apparatus 15 to the latest version more easily in addition to the above effect.

Computer program for executing the various kinds of processing executed by the client apparatuses 12, 13, and 15, the information processing apparatuses 16, 17, and 19, and the external apparatus 18 according to the embodiments are embedded and provided in a ROM, for example.

The computer programs for executing the various kinds of processing executed by the client apparatuses 12, 13, and 15 the information processing apparatuses 16 and 17, and the external apparatus 18 according to the embodiments may be recorded and provided in a computer-readable recording medium such as a compact disc read only memory (CD-ROM), a flexible disk (FD), a compact disc recordable (CD-R), and a digital versatile disc (DVD), as a file in format installable on or format executable by these apparatuses.

The computer programs for executing the various kinds of processing executed by the client apparatuses 12, 13, and 15 the information processing apparatuses 16 and 17, and the external apparatus 18 according to the embodiments may be stored in a computer connected to a network such as the Internet and provided by being downloaded via the network. The computer programs for executing the various kinds of processing executed by the client apparatuses 12, 13, and 15 the information processing apparatuses 16 and 17, and the external apparatus 18 according to the embodiments may be provided or distributed via a network such as the Internet.

The computer programs for executing the various kinds of processing executed by the client apparatuses 12, 13, and 15 the information processing apparatuses 16 and 17, and the external apparatus 18 according to the embodiments have a module structure containing the above units. As actual hardware, a CPU reads each of the programs from a storage medium such as a ROM and executes it, whereby the units are loaded onto the main memory and are generated on the main memory.

The present invention produces an advantageous effect of making it possible to maintain an environment in which connection from client apparatuses to external networks is controlled and to reduce loads on the manager side when the control program is installed on the client apparatuses.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing device, comprising:
a network interface configured to be switchably connected to a first network and a second network different from the first network, the first network being connected to one or more client devices and one or more image processing devices, the second network being connected to an external device; and
processing circuitry configured to
while the network interface is connected to the first network, receive, through the first network, client information relating to a client device of the one or more client devices and device information relating to an image processing device among the one or more image processing devices, the client information and the device information being sent from the client device,
control the network interface to switch a connection from the first network to the second network after receiving the client information and the device information,
after the network interface is connected to the second network, obtain software to be installed on the client device from the external device through the second network, the software being operable on the client device and controlling the image processing device from the client device, control the network interface to switch the connection from the second network to the first network after obtaining the software, and send the obtained software to the client device through the first network, so that the client device installs the obtained software.

2. The information processing device according to claim 1, wherein the processing circuitry specifies the client device on which a client application for acquiring the software from the information processing apparatus has been installed, among the one or more client devices, and the processing circuitry transmits, to the specified client device, identification information of the information processing device and a transmission request of download request information that requests downloading of the software.

3. The information processing device according to claim 2, wherein the processing circuitry is further configured to acquire the client application of a latest version from the external device, and update the installed client application to the acquired client application of the latest version.

4. The information processing device according to claim 3, wherein the processing circuitry is further configured to receive, from the specified client device via the first network, a version of the client application installed on the client device, and transmit, when the received version is older than the acquired latest version, to the client device via the first network, update instruction information that instructs updating to the client application of the latest version.

5. The information processing device according to claim 1, wherein the information processing device is portable.

6. The information processing device according to claim 1, wherein the image processing device is an image forming apparatus, and the software is a printer driver.

7. An information processing system, comprising:
an information processing device; and
a client device,
wherein the information processing device comprises:
a network interface configured to be switchably connected to a first network and a second network different from the first network, the first network being connected to one or more client devices and one or more image processing devices, the second network being connected to an external device; and processing circuitry configured to while the network interface is connected to the first network, receive, through the first network, client information relating to the client device of the one or more client devices and device information relating to an image processing device among the one or more image processing devices, the client information and the device information being sent from the client device, control the network interface to switch a connection from the first network to the second network after receiving the client information and the device information, after the network interface is connected to the second network, obtain software to be installed on the client device from the external device through the second network, the software being operable on the client device and controlling the image processing device from the client device, control the network interface to switch the connection from the second network to the first network after obtaining the software, and send the obtained software to the client device through the first network, so that the client device installs the obtained software.

8. The information processing system according to claim 7, wherein the client device includes a processor configured to install the software received from the information processing device on the client device.

9. A non-transitory computer-readable medium including a program that, when executed by processing circuitry of an information processing device, causes the information processing device to perform a method comprising:

while a network interface is connected to a first network, receiving, through the first network, client information relating to a client device of one or more client devices and device information relating to an image processing device among one or more image processing devices, the client information and the device information being sent from the client device;

controlling the network interface to switch a connection from the first network to a second network after receiving the client information and the device information;

after the network interface is connected to the second network, obtaining software to be installed on the client device from the external device through the second network, the software being operable on the client device and controlling the image processing device from the client device;

controlling the network interface to switch the connection from the second network to the first network after obtaining the software; and sending the obtained software to the client device through the first network, so that the client device installs the obtained software.

* * * * *